United States Patent [19]

Woerner et al.

[11] 4,318,942

[45] Mar. 9, 1982

[54] PROCESS FOR PRODUCING POLYCRYSTALLINE SILICON

[75] Inventors: Lloyd M. Woerner, Carlsbad; Edward B. Moore, Capistrano Beach, both of Calif.

[73] Assignee: J. C. Schumacher Company, Oceanside, Calif.

[21] Appl. No.: 69,703

[22] Filed: Aug. 27, 1979

Related U.S. Application Data

[63] Continuation-in-part of Ser. No. 935,009, Aug. 18, 1978, abandoned.

[51] Int. Cl.³ .................. C01B 33/02; C01B 33/107
[52] U.S. Cl. .................................. 427/213; 423/342; 423/349; 423/DIG. 16; 427/86; 427/215
[58] Field of Search ....... 423/342, 349, 350, DIG. 16; 427/213, 215, 86

[56] References Cited

U.S. PATENT DOCUMENTS

| | | | |
|---|---|---|---|
| 2,595,620 | 5/1952 | Wagner et al. | 423/342 |
| 2,925,357 | 2/1960 | Kothen | 423/349 X |
| 3,012,861 | 12/1961 | Ling | 423/349 X |
| 3,050,365 | 8/1962 | Nelson et al. | 423/633 X |
| 4,092,446 | 5/1978 | Padovani et al. | 427/213 |
| 4,117,094 | 9/1978 | Blocher et al. | 423/350 |
| 4,207,360 | 6/1980 | Padovani | 427/213 |

FOREIGN PATENT DOCUMENTS

| | | |
|---|---|---|
| 207362 | 1/1960 | Austria ................ 423/350 |
| 896258 | 9/1958 | United Kingdom . |
| 924545 | 6/1961 | United Kingdom . |

*Primary Examiner*—Jack Cooper
*Attorney, Agent, or Firm*—Knobbe, Martens, Olson, Hubbard & Bear

[57] ABSTRACT

An economical, low temperature, closed loop, thermal decomposition process is provided for producing a controllable mixture of heterogeneously and homogeneously nucleated ultrahigh purity polycrystalline silicon suitable for use in the manufacture of semiconductor devices and photovoltaic solar cells. The process manipulates the equilibrium expressed by the chemical reaction

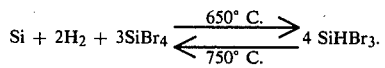

$$Si + 2H_2 + 3SiBr_4 \underset{<750°\,C.}{\overset{650°\,C.}{\rightleftarrows}} 4\,SiHBr_3.$$

2 Claims, 1 Drawing Figure

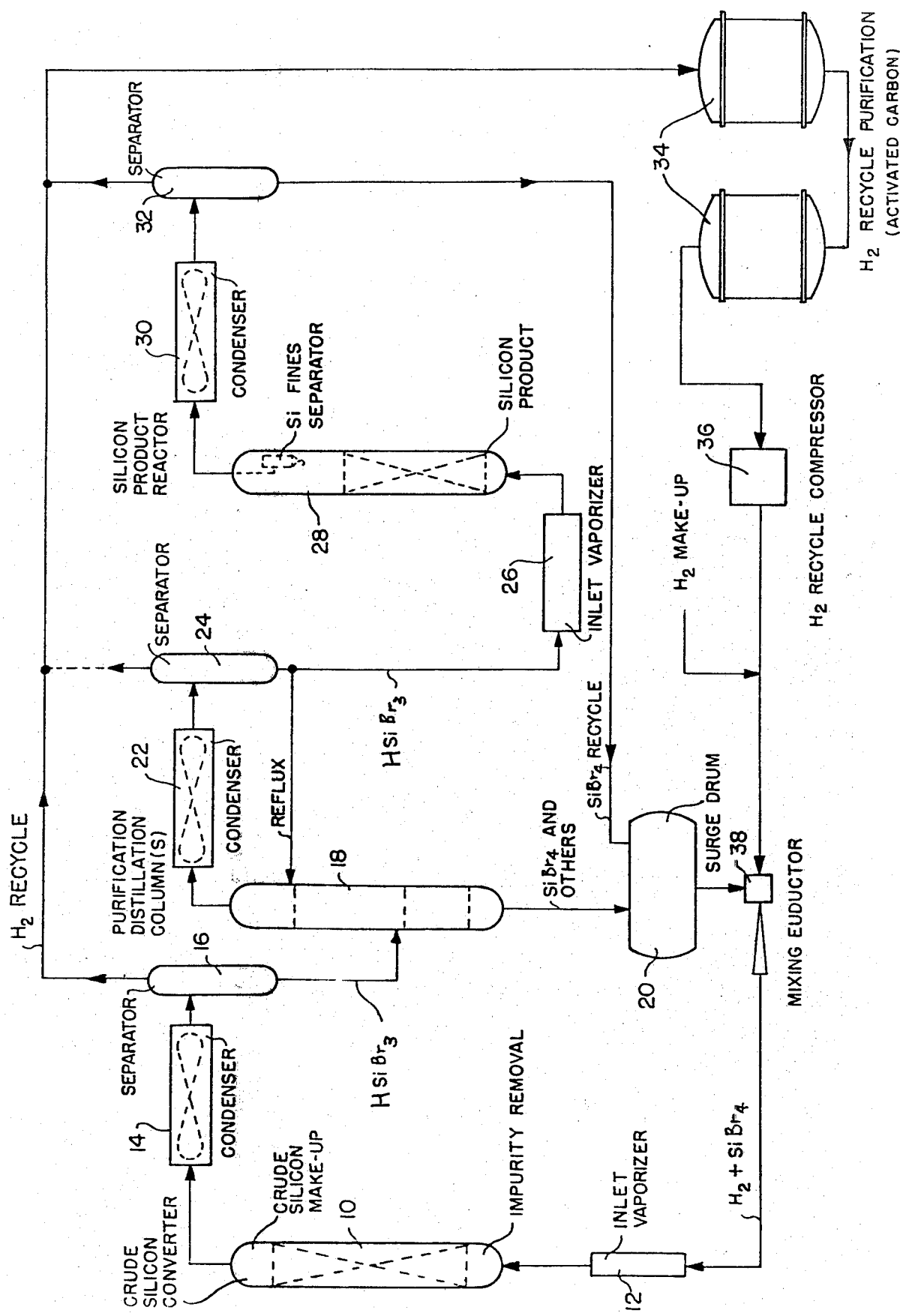

PROCESS FOR PRODUCING POLYCRYSTALLINE SILICON

This invention arose from the performance of a contract with the Jet Propulsion Laboratory and the National Aeronautics and Space Administration.

This application is a continuation-in-part of copending application Ser. No. 935,009 Aug. 18, 1978, now abandoned.

BACKGROUND OF THE INVENTION

U.S. Pat. No. 4,084,024 which issued Apr. 11, 1978 in the name of Joseph C. Schumacher, and which is assigned to the present assignee, discloses and claims a process for the production of semiconductor grade silicon using hydrogen reduction at relatively high temperatures, for example, within a temperature range of from 900° C.–1200° C. The process of the present invention, on the other hand, involves a process for producing a semiconductor grade silicon involving the use of thermal decomposition which is carried out at a lower and more economical temperature range of, for example, 500° C.–900° C.

As pointed out in the patent, recent developments in the semiconductor industry have created a growing demand for a low cost single crystal silicon of extremely high purity, which is known as semiconductor grade silicon, and which is used in the manufacture of semiconductor devices and silicon photovoltaic solar cells. For that reason, a multitude of prior art processes have been conceived for the production of semiconductor grade silicon, including the process covered by the patent. The prior art processes can be classified into the following six basic approaches:

1. The Siemens process described in GDR Pat. Nos. 1,066,564; 1,102,117; 1,233,815 and British Pat. No. 904,239 by which essentially all current semiconductor grade polycrystalline silicon is produced, is expressed by the following chemical reaction.

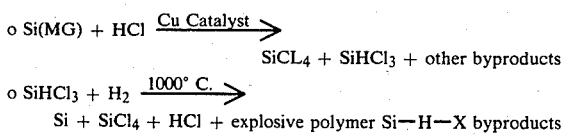

This is a high temperature batch process providing heterogeneously nucleated silicon growth on heated Si filaments and large volumes of $SiCl_4$ and explosive polymeric byproducts which must be disposed of. The process is as a result of these byproducts, not a closed-loop process. In addition, a 20/1 excess of $H_2$ over stoichiometry is required.

2. Silicon tetrachloride-hydrogen reduction is utilized in some cases because of the availability of byproduct $SiCl_4$ from the Siemens process. An alternative $SiCl_4$ production reaction is included here since it may be used as a source.

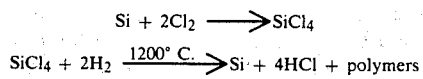

This again is a high temperature, non-closed-loop, batch process providing heterogeneously nucleated growth on a heated substrate and requires a large $H_2$ excess.

3. The DuPont process as described in U.S. Pat. Nos. 3,012,862 and 4,084,024 where in $SiX_4$ or $SiHX_3$ (where X=Cl,Br,I) is reduced in a fluid or moving bed by $H_2$, Zn, or Cd. The reaction chemistry is as follows:

I. Feed preparation $$(MG)Si + 3HX \rightarrow SiHX_3 + SiX_4 + H_2 \text{ etc.}$$

with $SiX_4$ here a byproduct
or $$(MG)Si + 2X_2 \rightarrow SiX_4$$

II. Ultrapure silicon production by

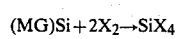

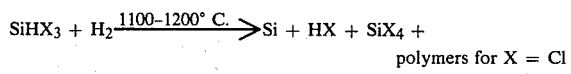

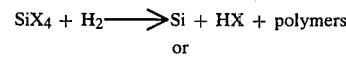

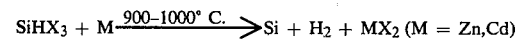

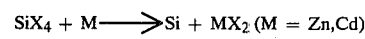

These are moderately high temperature, non-closed loop processes with the byproducts varying the particular process chemistry, and which require large hydrogen excesses where it is used. However, it is reported in U.S. Pat. No. 3,012,862 that large quantities of amorphous silicon is produced in the halosilane decomposition which is a finely dispersed powder and which must be avoided if the apparatus is to operate properly without becoming plugged and which must be removed from the end product. Attempts are made to avoid the formation of amorphous silicon by introducing a diluent into the process to dilute the silane; which at best merely suppresses to some extent the formation of amorphous silicon and which requires extraneous equipment. It is also suggested that the formation of the amorphous silicon can be suppressed by operating the reactor at a vacuum pressure which likewise, requires extraneous equipment and which creates sealing problems. The process of the present invention is unique in that it uses undiluted tribromosilane at standard atmospheric pressure (14.7 p.s.i.A.) or above, up to, for example, 50 p.s.i.A, and yet eliminates completely the formation of amorphous silicon product.

4. The Iodide process described in U.S. Pat. No. 3,020,129 expressed as follows:

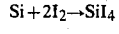

and thermal decomposition to produce Si

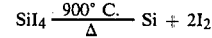

This is a moderate-temperature closed-loop batch process in which polycrystalline or single crystal silicon is grown on a seed particle or heated filament.

5. The Union Carbide process expressed as follows: Tricholorosilane preparation $$Si + 2H_2 + 3SiCl_4 \xrightarrow{500°\,C.} 4SiHCl_3$$

Ion exchange redistribution to silane according to

○ $2SiHCl_3 \xrightarrow[\text{Amberlite}]{50-100°\,C.} SiH_2Cl_2 + SiCl_4$

○ $2SiH_2Cl_2 \xrightarrow[\text{Amberlite}]{50-100°\,C.} SiH_3Cl + SiHCl_3$

○ $4SiH_3Cl \xrightarrow[\text{Amberlite}]{50-100°\,C.} 3SiH_4 + SiCl_4$ with appropriate byproduct recycle followed by silane thermal decomposition.

$$SiH_4 \xrightarrow{500-900°\,C.} Si + 2H_2$$

This is a low temperature, closed-loop process involving an ion exchange intermediate redistribution and produces homogeneously nucleated product.

6. The thermal decomposition of trichlorosilane according to $$4SiHCl_3 \xrightarrow{800-1000°\,C.} Si + 2H_2 + 3SiCl_4$$

is described in U.S. Pat. Nos. 2,943,918 and 3,012,861. Presumably the trichlorosilane is prepared according to $$Si + HCl \rightarrow SiHCl_3 + SiCl_4 + \text{other products}$$

so that a non-closed process would result. Only batch type operation is proposed to promote heterogenous nucleation and homogeneous nucleation is avoided and thought harmful.

Many other techniques and slight modifications of the techniques presented are contained within the prior art, however, none would appear to have a material bearing on the present invention.

An important feature of the process of the invention is that it is a continuous process unlike the prior art batch process 1, 2, 4 and 6 described briefly above. As is well known, the continuous process represents an improvement over the batch processes in the reduction of capital costs and operating expenses per unit of product.

Another important feature of the process of the present invention is that it is a closed-loop low temperature process; whereas the prior art processes 1, 2, 3 and 6, supra, are high temperature, open-loop processes. The prior art processes represent higher operating expenses due to their excessive energy requirements and the need for the disposal of corrosive and hazardous byproducts.

Another feature of the process of the invention is that it utilizes a direct high yield thermal decomposition of tribromosilane in contrast to the low yield thermal decomposition process of U.S. Pat. Nos. 2,943,918 and 3,012,861, rather than going through the ion exchange redistribution of prior art process 5 in order to obtain a material suitable for thermal decomposition. The inherent simplicity of the process of the present invention results in a reduction in complexity and operating costs and an improvement in yield capabilities.

Another important feature of the process of the invention is the avoidance of wall build-up in the thermal decomposition reaction by maintaining a critical temperature differential between the bed and the surrounding walls.

BRIEF DESCRIPTION OF THE DRAWING

The FIGURE is a schematic representation of one embodiment of the process of the invention.

DETAILED DESCRIPTION OF THE ILLUSTRATED EMBODIMENT

In the first process step, in accordance with the invention, metallurgical grade silicon metal of approximately 95% or greater purity is reacted in hydrogen ($H_2$) and the appropriate silicon tetrabromide ($SiBr_4$) in a crude silicon converter 10 to produce tribromosilane and in which the reaction:

$$Si + 3SiBr_4 + 2H_2 \rightarrow 4HSiBr_3$$

is carried out. The converter may be a first stage fluid bed reactor maintained within a temperature range of substantially 400° C.-650° C., and at atmospheric or greater pressure. The converter may be of the type described, for example, in U.S. Pat. No. 2,993,762.

The metallurgical grade silicon may be generated locally in an electrothermic silicon generator of known construction, as described in U.S. Pat. No. 4,084,024, or it may be obtained from usual commercial sources. The metallurgical grade silicon is preferably in the particle size range of 50–500 microns to provide good fluidization characteristics. Fluidization is provided by hydrogen gas containing tetrabromide vapor which is introduced into the reactor through an inlet vaporizer 12. Conversion efficiencies of 30% or greater of stoichiometric are achieved in the reactor.

A mixture of tribromosilane ($SiHBr_3$) and unreacted hydrogen ($H_2$) and tetrabromosilane is carried from the top of the reactor 10 in vapor phase to a condenser 14. Impurity metal bromides are removed from the bottom of reactor 10.

The hydrogen and tribromosilane are separated out in a separator 16, with the hydrogen being returned to the reactor 10. The tribromosilane is introduced to a refiner 18 in which it is purified in accordance with the second step of the process. During the second step unreacted silicon tetrabromide is recovered and returned to the feed system for the reactor 10 through a surge drum 20.

It is important to recognize that the conversion reaction in reactor 10 in accordance with the first step of the process of the invention occurs in a non-equilibrium manner. That is to say, the reaction at 400°–650° C. in the reactor of $$Si + 2H_2 + 3SiBr_4 \rightarrow 4SiHBr_3$$

has a positive free energy of 5–20 Kcal per mole and an equilibrium constant less than unity since $\Delta F = -RT \ln K_p$. As a result, the reaction products must be continuously removed from the reactor. The production of tribromosilane ($SiHBr_3$) thereby occurs as a result of the operation of the law of mass action under non-equilibrium conditions.

The second step of the process involves the purification of the tribromosilane in a refiner 18 by the distillation of the tribromosilane prior to the further processing thereof into ultrahigh purity polycrystalline silicon. Refiner 18 may be a simple, multiplate distillation column, and it is utilized to separate the feed tribromosilane into a mixture of less than 5% tetrabromosilane in tribromosilane of metallic and organic impurity content less than 100 parts per billion total; and a mixture of tribromosilane and tetrabromosilane which has significantly greater than 100 parts per billion metallic and organic impurities, as bottoms. The bottoms are returned to the first stage reactor 10 through the surge drum 20, as explained above. The overhead is fed to a reactor 28 through a condenser 22 and separator 24, and through an inlet vaporizer 26, so that the third step of the process may be carried out. As in the previous stage, the hydrogen from separator 24 is recycled to the feed for the first stage reactor 10. Refiner 18 may be of the type described in detail in Adcock et al U.S. Pat. No. 3,120,128.

The third step of the process of the invention effectuates the thermal decomposition of tribromosilane in reactor 28 within a temperature range of the order of 600°–800° C., and at atmospheric or greater pressure. The thermal decomposition is in accordance with the reaction $$4HSiBr_3 \rightarrow Si + 3SiBr_4 + 2H_2.$$

The reactor contains high purity silicon particles which act as substrates for silicon deposition.

The product, ultrapure semiconductor grade silicon is produced in reactor 28 along with the byproducts hydrogen and tetrabromosilane. The byproducts are recovered and separated by a condenser 30 and separator 32, and they are recycled as feed for the first stage reactor 10, as illustrated, to achieve a closed-loop process.

The recycled hydrogen is purified in an activated carbon filter 34 of known construction, and is compressed by a compressor 36. The purified and compressed hydrogen is then passed to a mixing eductor 38, in which it is mixed with the tetrabromide from surge drum 20 and fed to the first stage reactor 10. Make-up hydrogen may also be added, as indicated.

Reactor 28 may be a moving bed reactor of the type described in detail in U.S. Pat. No. 4,084,024; or it may be a fluid bed reactor of the type described in U.S. Pat. Nos. 3,012,861; 3,012,862 or 3,963,838.

An important feature of the process of the present invention is the production of ultra-pure semiconductor grade silicon in reactor 28 at a relatively low temperature lying, for example, within a range of essentially 500°–800° C., without the introduction of hydrogen into the reactor; as compared with the high temperature (900° C.–1500° C.) hydrogen reduction in the reactor as described in U.S. Pat. No. 4,084,024; and without the need for a diluent or for vacuum pressures as in the processes of U.S. Pat. No. 3,012,861. The process of the present invention is predicated upon the premise that the chemical reaction $$4HSiBr_3 \rightarrow Si + 3SiBr_4 + 2H_2$$

occurs in a temperature range of the order of 600°–800° C., and at atmospheric pressure (14.7 PSIA) or above, producing a high yield (80%–100%) of purified semiconductor grade silicon deposited on a substrate consisting of fine particles of the purified silicon, and without any tendency to produce amorphous silicon. In all the processes described in U.S. Pat. No. 3,012,861, it was found necessary to use a diluent or vacuum pressure to avoid the production of amorphous silicon. Amorphous silicon is formed as a fine powder which has a tendency to clog the equipment, and it is essential that its formation be prevented.

Above 900° C., for example, the mechanism of reactor 28 changes and the yield of silicon falls to a low value, of the order of 10%, as described, for example, in U.S. Pat. No. 3,012,861. Hydrogen must be added in the high temperature range above 900° C., as described in U.S. Pat. No. 4,084,024, in order to produce high quality silicon in accordance with the reaction $$HSiX_3 + H_2 \rightarrow Si + 3HX$$

An important feature of the process of the invention is its "closed loop" aspect, which makes the process economically feasible. Specifically, there are essentially no byproducts produced by the process which are not recycled back for re-use, and the only material actually "consumed" in the process is impure silicon, which is converted into ultra-pure semiconductor grade silicon.

In the practice of the process of the invention, it is advantageous to hold wall temperatures in the fluid or moving bed reactor 28 at greater than 900° C. (i.e. in a range of 900° C.–1050° C.) while maintaining bed temperature between 700° C. and 800° C. Reactor wall scale and reactor plugging are thereby avoided.

This is an unexpected result for the following reason. With a chemical reaction of the type under consideration, namely thermal decomposition, thermodynamic calculations will always indicate that the reaction will go further to completion as the reaction temperature is raised. Therefore, a superficial consideration of the matter would indicate that increasing wall temperature would cause more scale rather than less. However, the present inventors have found that reactor wall scale is eliminated by maintaining the reactor wall temperature in the range of 950°–1050° C., thereby causing a radial thermal gradient to exist towards the reactor bed. This causes the wall scale to be eliminated as it is formed in the high temperature region at the reactor wall through an etching action. However, this etching action is significantly reduced in rate and extent towards the reactor bed because of the drop in temperature.

In most fluid or moving bed reactors, reaction heat for endothermic chemical reactions is obtained by heating the reactor walls by gas firing, resistance heating, induction heating or by various other means. However, reaction rate and extent are generally directly proportional to temperature so that considerable reaction and deposition takes place on the walls as described in U.S. Pat. No. 3,963,838. These deposits generally occur at the highest temperature portion of the reactor. Wall deposits, thus formed, in time build up and cause, not only time-dependent heat transfer characteristics, but also reduced heat transfer and eventual reactor plugging. It has been found that silicon deposition from the thermal decomposition of tribromosilane ceases at a temperature of 900° C.–1000° C. Thus, wall deposition in the process of the present invention is avoided by holding wall temperatures in a range of 900° C.–1000° C., while maintaining bed temperatures in a range extending from 700° to 850° C. to establish maximum silicon deposition rate and yield.

A specific example of the conversion of tetrabromosilane to tribromosilane in the first stage reactor 10 is as follows:

A combined gaseous stream of hydrogen and tetrabromosilane were introduced into reactor 10 which contained a heated bed of silicon particles. The gaseous stream had a composition of 2.23 moles of hydrogen per mole of tetrabromosilane. The silicon bed had a cross-sectional area of 4.54 square centimeters and a length of 40 centimeters. The bed temperature was maintained at 650° C., and the average residence time of the gaseous stream was 5.1 seconds. The silicon particles introduced into the reactor 10 were metallurgical grade. Condensation of the exit stream from the reactor in condenser 14, followed by subsequent disillation of the condensate in the purification distillation column 18 indicated a 36% conversion of the tetrabromosilane into tribromosilane. Conversion is defined as the moles of tribromosilane obtained from the reaction divided by the intial number of moles of tetrabromosilane introduced into the reactor.

Specific example of the decomposition of tribromosilane to silicon in reactor 28.

A gaseous stream of tribromosilane was introduced to a fluidized bed reactor which had been filled with 260 grams of 80 mesh silicon. The average core temperature of the reactor was maintained at 764° C. during a test run lasting 400 minutes. In the test, 0.765 g/min of tribromosilane vapor at 15 PSIA was charged to the reactor. The total tribromosilane used during the test was 1.14 g moles. At the completion of the test 266.9 grams of silicon was recovered from the reactor, reflecting an increase of 6.9 grams. This weight increase corresponds to a yield of 87%, ased on the decomposition reaction $$4HSiBr_3 \rightarrow Si + 3SiBr_4 + 2H_2$$

The invention provides, therefore, a low-temperature, closed-loop zero effluent, continuous process for the economical production of high purity semiconductor grade silicon, where the high purity silicon is the only material discharged by the process (except for rejected impurities contained in the original metallurgical grade silicon feedstock). The process of the invention, as described, utilizes the direct thermal decomposition of tribromosilane at relatively low temperatures (below 900° C.) to produce ultrapure silicon. The process may be operated at atmospheric pressure and does not require a diluent. The process also avoids silicon wall scale build-up in the reactor by maintaining a temperature differential between the bed and the surrounding wall such that the lowest temperature of the wall is above the threshold temperature at which silicon is deposited thereon. The process of the invention eliminates the need for low pressure and/or a diluent to prevent the formation of the not only useless, but troublesome, amorphous silicon; and it also eliminates the explosive silicon polymer byproduct known to occur in commercial practice of the examples cited in U.S. Pat. No. 3,012,861.

It will be appreciated that although a particular embodiment of the invention has been shown and described, modifications may be made. It is intended in the claims to cover the modifications which come within the true spirit and scope of the invention.

What is claimed is:

1. In a process for producing high purity silicon by the thermal decomposition of halosilane, the improvement comprising:

passing tribromosilane substantially undiluted through a bed of high purity silicon substrate particles in a product reactor at a reaction temperature of from about 600 to about 800 degrees C. and a pressure of at least about atmospheric pressure thereby effecting thermal decomposition of said tribromosilane to deposit high purity polycrystalline silicon on said substrate particles and to produce silicon tetrabromide and hydrogen as reaction products without the production of silicon polymers as an explosive byproduct and amorphous silicon as a clogging byproduct wherein the bed of high purity silicon substrate particles is a moving or fluid bed and further including the step of heating the product reactor walls to a temperature of at least about 900° C. thereby preventing accumulation of product reactor wall scale.

2. In a process for producing high purity silicon by the thermal decomposition of halosilane, the improvement comprising the steps of:

(a) producing tribromosilane by reacting silicon, silicon tetrabromide and hydrogen in a synthesis reactor at a temperature of from about 450 to about 650 degrees C.;

(b) separating tribromosilane produced in step (a) from reagents and other reaction products of step (a);

(c) passing said separated tribromosilane from step (b) substantially undiluted through a bed of high purity silicon substrate particles in a product reactor at a reaction temperature of from about 600 to about 800 degrees C. and a pressure of at least about atmospheric pressure thereby effecting thermal decomposition of said tribromosilane to deposit high purity polycrystalline silicon on said substrate particles and to produce silicon tetrabromide and hydrogen as reaction products without the production of silicon polymers as an explosive byproduct and amorphous silicon as a clogging byproduct; and (d) feeding hydrogen and silicon tetrabromide byproducts from step (c) into the synthesis step (a) wherein the bed of high purity silicon substrate particles is a moving or fluid bed and further including the step of heating the product reactor walls to a temperature of at least about 900° C. thereby preventing accumulation of product reactor wall scale.

* * * * *